(12) United States Patent
Parker

(10) Patent No.: US 7,448,637 B2
(45) Date of Patent: Nov. 11, 2008

(54) STEP DEVICE FOR ACCESSING A TRUCK BED

(76) Inventor: Rick J. Parker, P.O. Box 1042, Hailey, ID (US) 83333

( * ) Notice: Subject to any disclaimer, the term of this patent is extended or adjusted under 35 U.S.C. 154(b) by 0 days.

(21) Appl. No.: 11/612,572

(22) Filed: Dec. 19, 2006

(65) Prior Publication Data

US 2008/0143072 A1  Jun. 19, 2008

(51) Int. Cl.
*B60R 3/00* (2006.01)
(52) U.S. Cl. .................... 280/166; 280/163; 182/88
(58) Field of Classification Search ............. 280/163, 280/166; 182/88, 89, 91, 96, 127, 159; 296/62
See application file for complete search history.

(56) References Cited

U.S. PATENT DOCUMENTS

| | | | | |
|---|---|---|---|---|
| 1,363,396 A * | 12/1920 | Cross | ............. | 182/88 |
| 2,487,921 A * | 11/1949 | Culver | ............. | 182/89 |
| 2,575,615 A * | 11/1951 | Crump | ............. | 182/95 |
| 3,008,533 A * | 11/1961 | Haberle | ............. | 280/88 |
| 3,743,320 A * | 7/1973 | Clark | ............. | 280/166 |
| 3,756,622 A * | 9/1973 | Pyle et al. | ............. | 280/166 |
| 3,796,456 A * | 3/1974 | Bergeson et al. | ............. | 296/156 |
| 3,807,757 A * | 4/1974 | Carpenter et al. | ............. | 280/166 |
| 3,853,369 A * | 12/1974 | Holden | ............. | 296/62 |
| 3,912,299 A | 10/1975 | Carr | | |
| 3,980,319 A | 9/1976 | Kirkpatrick | | |
| 3,981,515 A | 9/1976 | Rosborough | | |
| 4,079,815 A * | 3/1978 | Cormier | ............. | 182/195 |
| 4,110,673 A * | 8/1978 | Magy et al. | ............. | 318/466 |
| 4,623,160 A * | 11/1986 | Trudell | ............. | 280/166 |
| 4,720,116 A * | 1/1988 | Williams et al. | ............. | 280/166 |
| 4,757,876 A * | 7/1988 | Peacock | ............. | 182/95 |
| 5,007,654 A | 4/1991 | Sauber | | |
| 5,039,119 A * | 8/1991 | Baughman | ............. | 280/166 |
| 5,195,609 A * | 3/1993 | Ham et al. | ............. | 182/90 |
| 5,228,707 A * | 7/1993 | Yoder | ............. | 280/166 |
| 5,341,897 A * | 8/1994 | Gross | ............. | 182/88 |
| 5,366,052 A * | 11/1994 | Keh-Lin | ............. | 182/88 |
| 5,697,470 A * | 12/1997 | Carle | ............. | 182/88 |
| 5,897,125 A | 4/1999 | Bundy | | |
| 5,957,237 A * | 9/1999 | Tigner | ............. | 182/127 |
| 6,036,208 A | 3/2000 | Frerichs | | |
| 6,270,139 B1 * | 8/2001 | Simpson | ............. | 296/62 |
| 6,474,668 B2 | 11/2002 | Debo | | |
| 6,659,485 B2 * | 12/2003 | Ueno | ............. | 280/166 |
| 6,840,526 B2 | 1/2005 | Anderson et al. | | |
| 7,017,708 B1 * | 3/2006 | Lynn | ............. | 182/35 |
| 7,168,722 B1 * | 1/2007 | Piotrowski et al. | ............. | 280/166 |

(Continued)

*Primary Examiner*—Christopher Ellis
*Assistant Examiner*—Katy Meyer
(74) *Attorney, Agent, or Firm*—Dale J. Ream

(57) ABSTRACT

A step device for accessing a truck bed according to the present invention includes a telescopic boom assembly that is movable between retracted and extended configurations. A first end of the boom assembly may be coupled to the frame of a truck. The step device may be hidden from view beneath the truck bed at the retracted configuration. The step device also includes a plurality of steps movable between collapsed and deployed configurations. A linkage couples at least one of the steps with the boom assembly such that the steps are moved between collapsed and deployed configurations as the boom assembly is moved between retracted and extended configurations, respectively. A latch selectively holds the boom assembly at the extended configuration and, when released, a tension member biases the boom member to move to the retracted configuration.

14 Claims, 7 Drawing Sheets

U.S. PATENT DOCUMENTS

| | | |
|---|---|---|
| 7,261,357 B1 * | 8/2007 | Bechen .................. 296/62 |
| 2002/0070577 A1 * | 6/2002 | Pool et al. ............... 296/62 |
| 2006/0066121 A1 * | 3/2006 | Derosier ................. 296/62 |

* cited by examiner

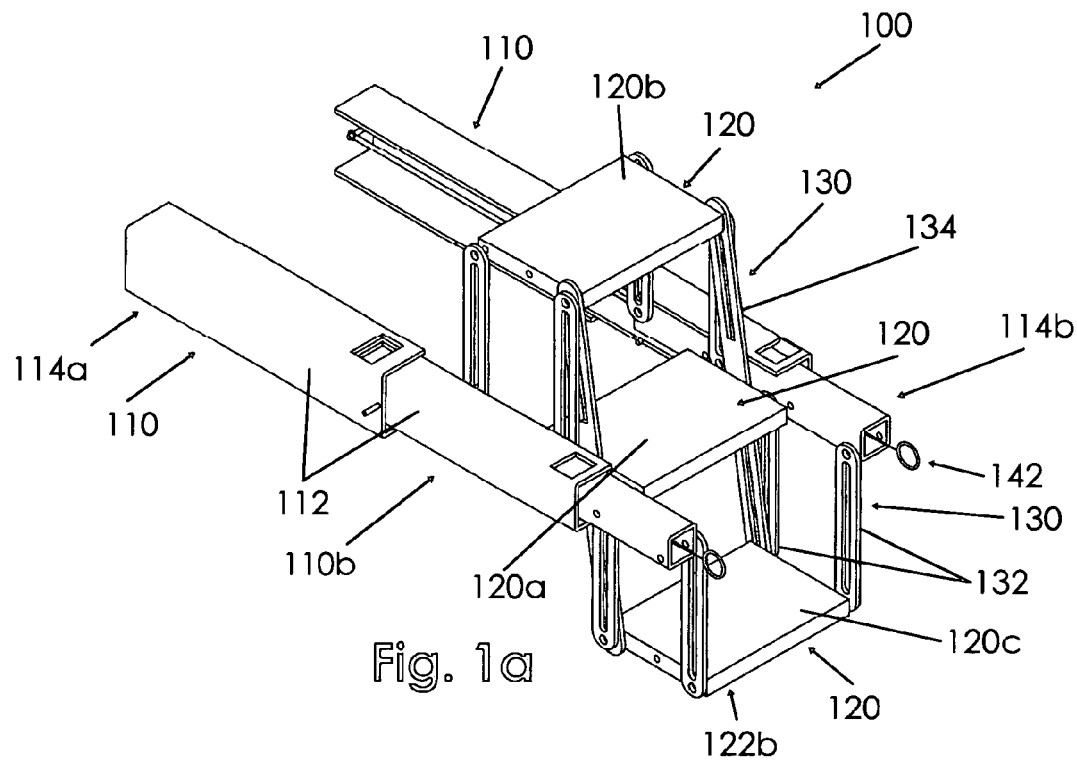
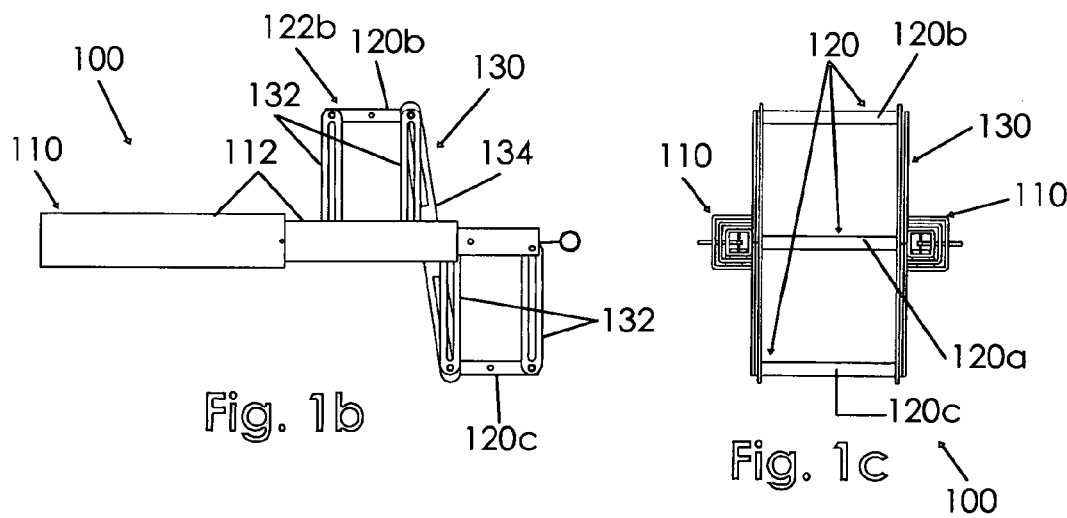

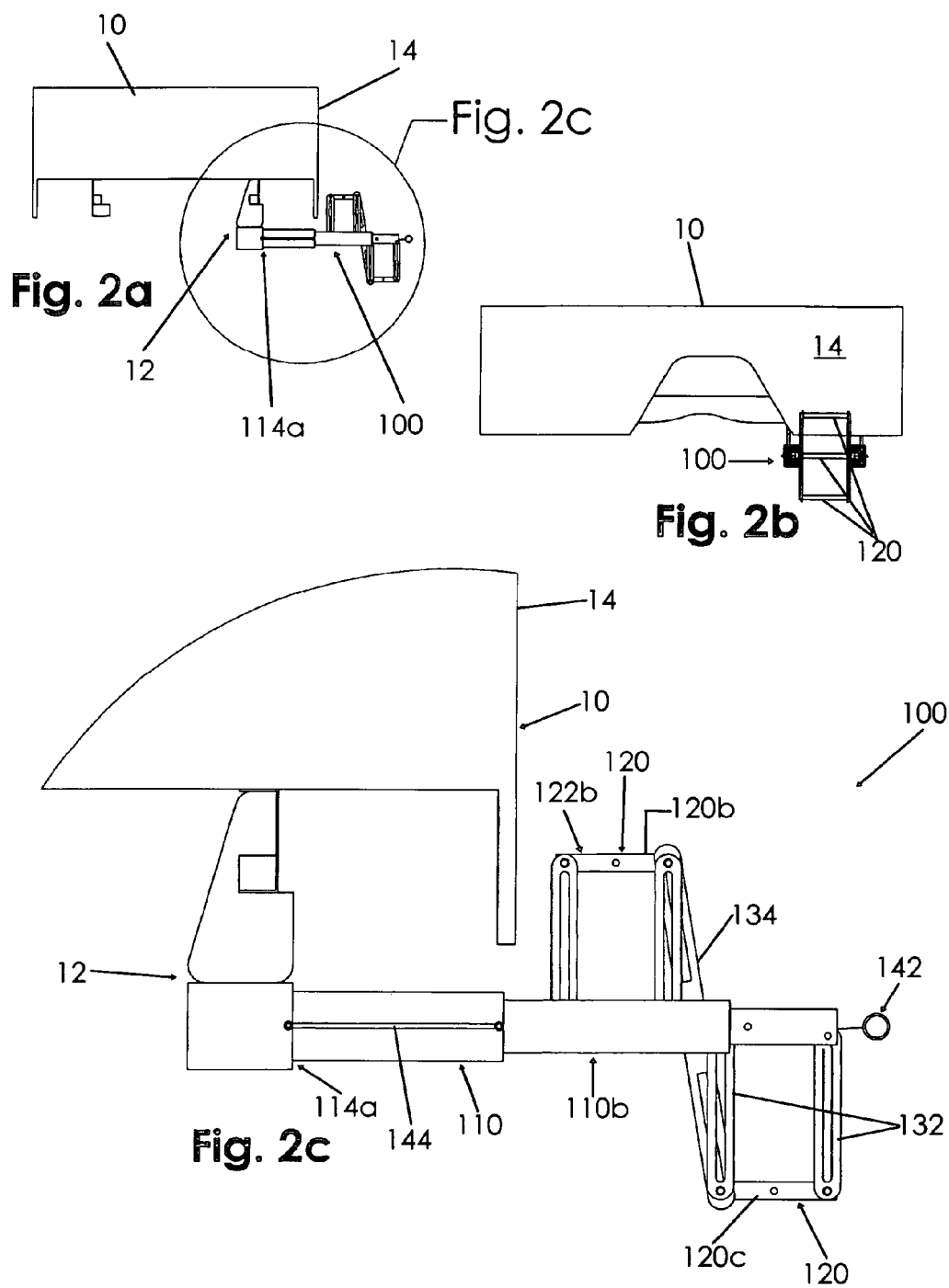

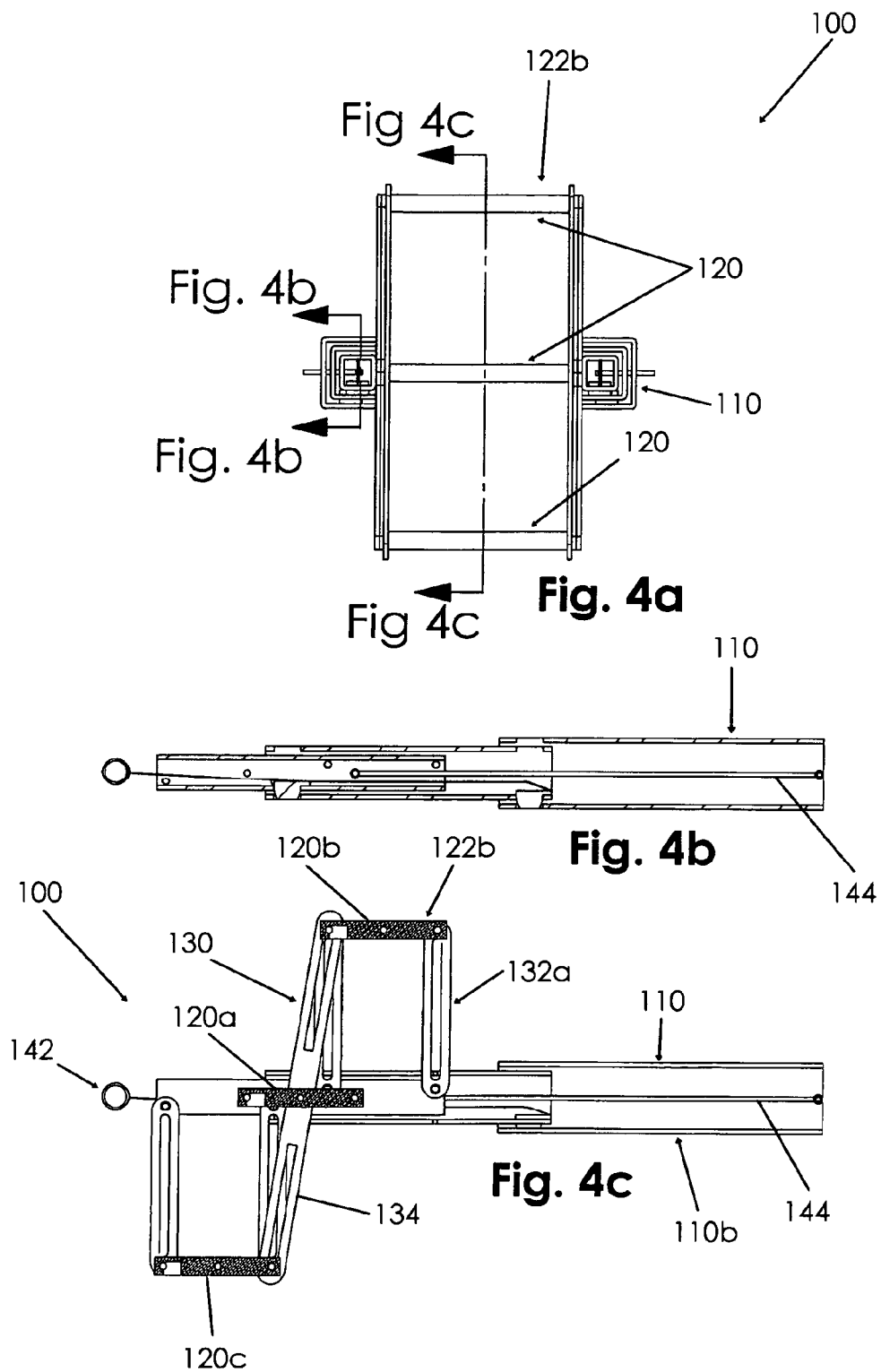

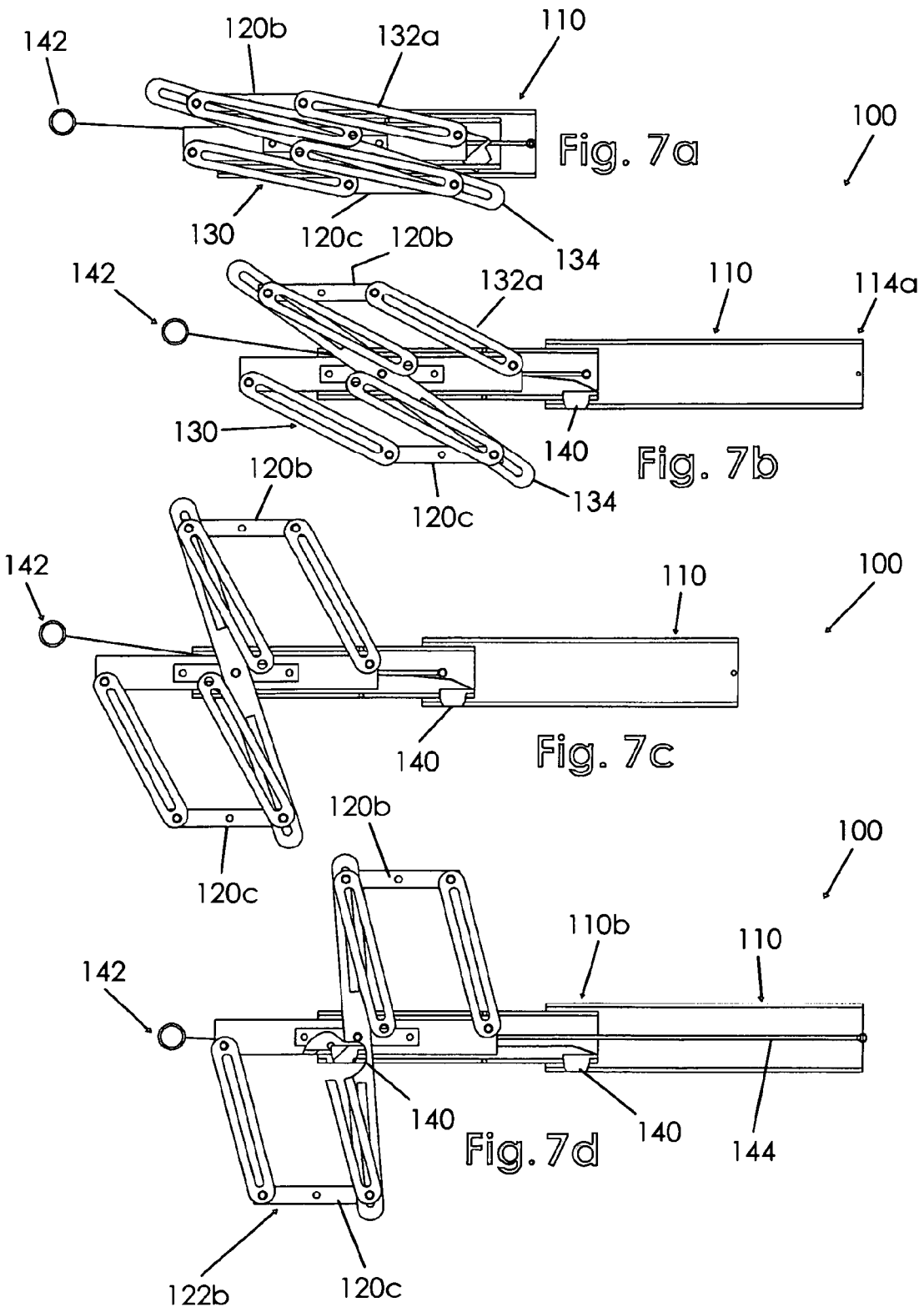

US 7,448,637 B2

STEP DEVICE FOR ACCESSING A TRUCK BED

BACKGROUND OF THE INVENTION

The present invention relates generally to truck accessories and, more particularly to a step device for accessing a truck bed.

There are many instances when a person desires or needs to climb up into the bed of a pickup truck, such as to remove cargo from the truck bed, secure an item therein, or simply to sit on the tailgate to rest for a while. Modern pickup trucks, however, are often too high off the ground for a person to step or climb up onto the tailgate easily or quickly. Having to literally climb up into the truck bed is especially inconvenient or even tiring if multiple trips into and out of the bed are necessary, such as when loading or unloading cargo.

Various devices have been proposed in the art for aiding a person to step up onto a truck tailgate. For example, U.S. Pat. No. 6,474,668 to Debo discloses a tailgate step that may be pulled out directly from the rear of the truck. Further, U.S. Pat. No. 3,980,319 to Kirkpatrick et al. is an example of a step that may be swung outwardly from the truck body. Although assumably effective for their intended purposes, the existing devices are not adjustable for use with different sized trucks, are not easily deployable with a single hand pull, or do not retract under their own power.

Therefore, it would be desirable to have a step device for accessing a truck bed that is easily deployable with a single hand pull, adjustable for use with trucks of different sizes, and that easily retracts without additional human force.

SUMMARY OF THE INVENTION

A step device for accessing a truck bed according to the present invention includes a telescopic boom assembly that is movable between retracted and extended configurations. The step device also includes a plurality of steps movable between collapsed and deployed configurations. A linkage couples at least one of the steps with the boom assembly. A first end of the boom assembly may be coupled to a frame of a truck bed, such as through welding, bolting, or the like. While a single boom assembly may be used, first and second boom assemblies may be used instead to provide more stability.

The steps are deployed when the boom assembly is moved from a retracted configuration to the extended configuration. At least one step is above the boom assembly when the steps are at the deployed configuration. At least another step is below the boom assembly when the steps are at the deployed configuration. The linkage that connects the steps and the boom assembly causes the steps to move between the collapsed and deployed configurations as the boom assembly is moved between the retracted and extended configurations.

A latch may be used to hold each boom assembly at the extended configuration, such as when a user is mounting or dismounting the steps. A release mechanism may be used to disengage the latch. A tension member such as a spring or tension cord may bias the boom assemblies toward the retracted configuration such that the whole assembly retracts under its own power when not needed.

Therefore, a general object of this invention is to provide a step device for accessing a truck bed.

Another object of this invention is to provide a step device, as aforesaid, having a telescopic boom assembly movable between retracted and extended configurations.

Still another object of this invention is to provide a step device, as aforesaid, having a plurality of steps connected to the boom assembly with a linkage for moving between collapsed and deployed configurations as the boom assembly is moved between retracted and extended configurations.

Yet another object of this invention is to provide a step device, as aforesaid, in which the boom assembly may be moved to the extended configuration with a single arm movement.

A further object of this invention is to provide a step device, as aforesaid, in which the boom assembly is biased to return to the retracted configuration.

A still further object of this invention is to provide a step device, as aforesaid, which may be stowed underneath the bed of a truck when positioned at the retracted configuration.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1a is a perspective view of a step device for accessing a truck bed according to a preferred embodiment of the present invention with a boom assembly and steps at extended and deployed configurations, respectively;

FIG. 1b is a side view of the step device as in FIG. 1a;

FIG. 1c is a front view of the step device as in FIG. 1a;

FIG. 2a is a side view of the step device as in FIG. 1a shown mounted to a frame of a truck bed;

FIG. 2b is a front view of the step device as in FIG. 1a and showing a side view of the truck bed;

FIG. 2c is an isolated view on an enlarged scale of the step device as in FIG. 2a;

FIG. 3b is a side view of the step device as in FIG. 3a;

FIG. 3c is a front view of the step device as in FIG. 3a;

FIG. 4a is a front view of the step device as in FIG. 1a;

FIG. 4b is a sectional view taken along line 4b-4b of FIG. 4a;

FIG. 4c is a sectional view taken along line 4c-4c of FIG. 4a;

FIG. 6b is an isolated view on an enlarged scale of the linkage shown in FIG. 6a;

FIG. 7a to 7d show the step device at various stages of extension and deployment between fully retracted and fully extended configurations.

DESCRIPTION OF THE PREFERRED EMBODIMENT

Figure 3A:
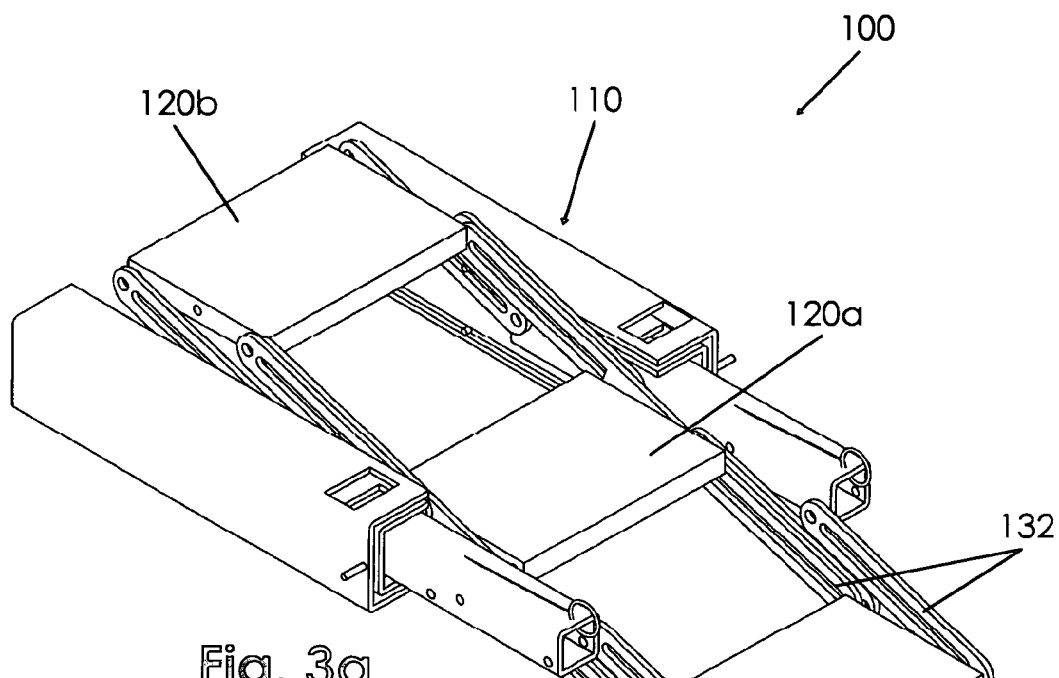
FIG. 3a is a perspective view of the step device according to the present invention with the boom assembly and steps at retracted and collapsed configurations, respectively.
Figure 3B:
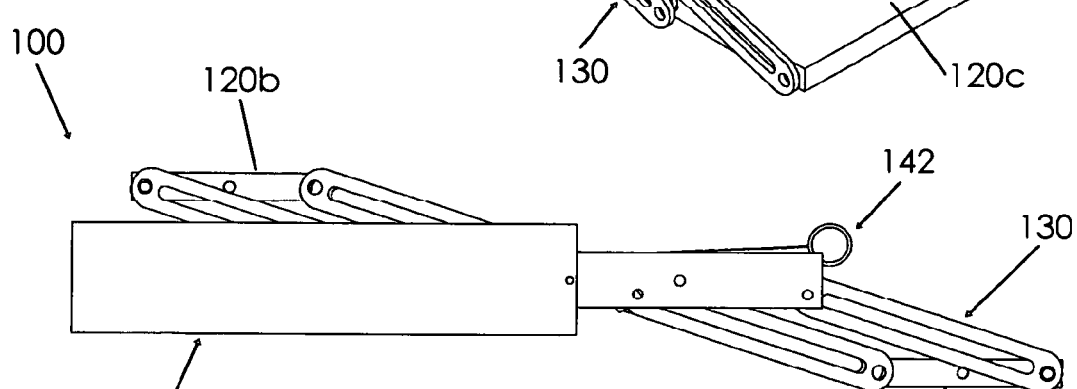
Figure 3C:
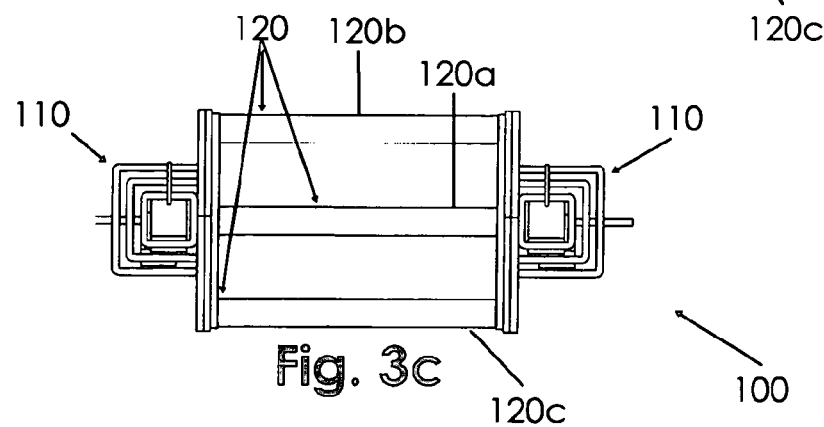
Figure 5:
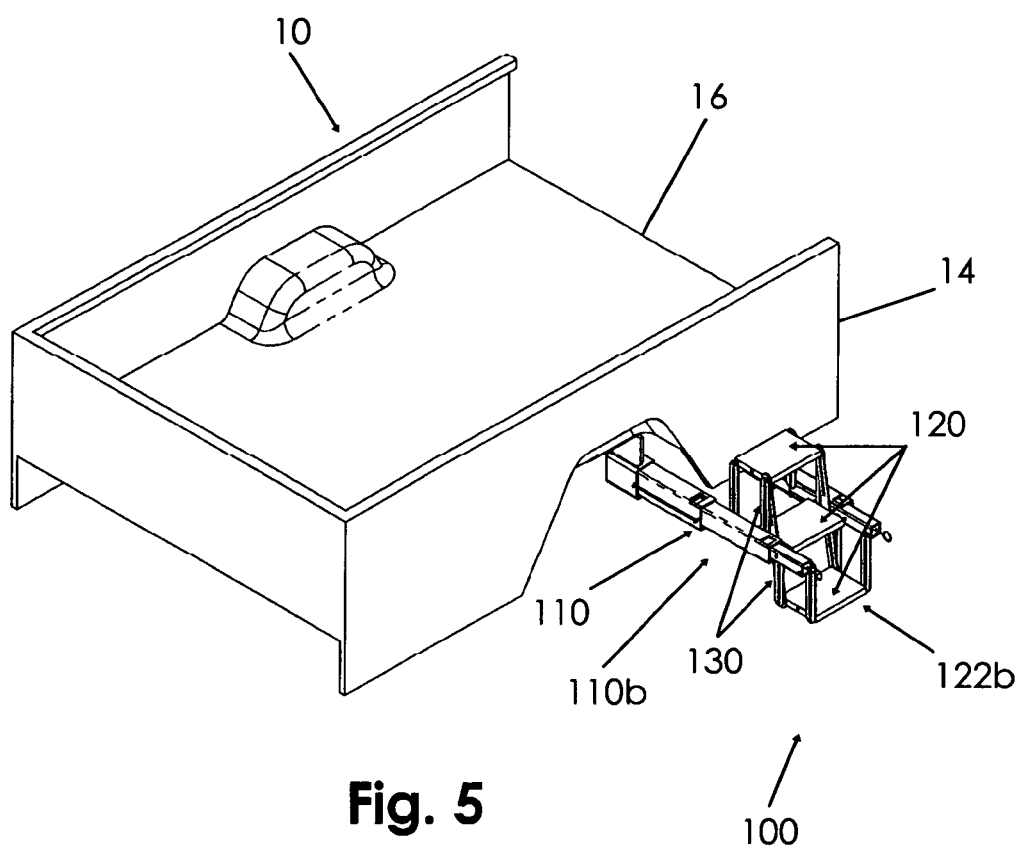
FIG. 5 is another perspective view of the step device mounted to a frame of a truck bed and positioned at an extended configuration.

A step device 100 according to the present invention for use in accessing a truck bed 10 will now be described in detail with reference to FIGS. 1a through 7d of the accompanying drawings. More particularly, a step device 100 according to the current invention includes a telescopic boom assembly 110, a plurality of steps 120, and linkage 130.

While a single boom assembly 110 may be used, first and second boom assemblies 110 may instead be used to provide additional stability, for example. The first and second boom assemblies 110 may be outside the steps 120 so that the steps 120 are between the first and second boom assemblies 110 as shown in FIG. 1a. Each boom assembly 110 includes a plurality of telescoping members 112, is movable between retracted and extended configurations 110a, 110b (FIG. 7b; FIG. 1a), and has first and second ends 114a, 114b. As shown in FIGS. 2a through 2c and FIG. 5, the first end 114a of the boom assemblies 110 may be coupled to a frame 12 of a truck bed 10, such as through welding, bolting, or another appropriate fastener. While the accompanying figures show the boom assemblies 110 extending from a side 14 of the truck bed 10, the boom assemblies 110 may alternately extend from a rear end 16 (FIG. 5) of the truck bed 10.

The steps 120 are movable between collapsed and deployed configurations 122a, 122b (FIG. 7b; FIG. 1a) and may be constructed of metal, wood, composite, or another appropriate material. While various numbers of steps 120 may be used according to different embodiments, an embodiment having three steps 120 is shown throughout the accompanying drawings. It should be understood that fewer or more steps may alternately be used, however.

As shown in FIG. 1a, one step 120a may be directly coupled to the boom assemblies 110 so that the step 120a is vertically immobile when the steps 120 move between the collapsed and deployed configurations 120a, 120b. In other words, the height of the step 120a may be generally constant in relation to the boom assemblies 110. Another step 120b may be above the boom assemblies 110 when the steps 120 are at the deployed configuration 122b, and yet another step 120c may be below the boom assemblies 110 when the steps 120 are at the deployed configuration 122b.

The steps 120b, 120c are coupled to the boom assemblies by the linkage 130, and the linkage 130 couples the steps 120b, 120c together. The linkage 130 may include at least two support links 132 coupling the respective steps 120b, 120c with each boom assembly 110, as shown in FIG. 1a. More particularly, the support links 132 may be rotatably coupled to the steps 120b, 120c and rotatably coupled to the boom assembly 110. As shown in FIG. 1a, the linkage 130 may be configured such that the steps 120b, 120c are generally equidistant from the boom assembly when the steps 120b, 120c are at the deployed configuration 122b. As shown in FIGS. 7a through 7d, this may additionally result in the steps 120b, 120c being generally equidistant from the boom assembly 110 when the steps 120b, 120c are at the collapsed configuration 122a and when the steps 120b, 120c are between the collapsed and deployed configurations 122a, 122b. If the step 120a is included, then, the steps 120a may be positioned so that the steps 120b, 120c are generally equidistant from the step 120a.

Figure 6A:
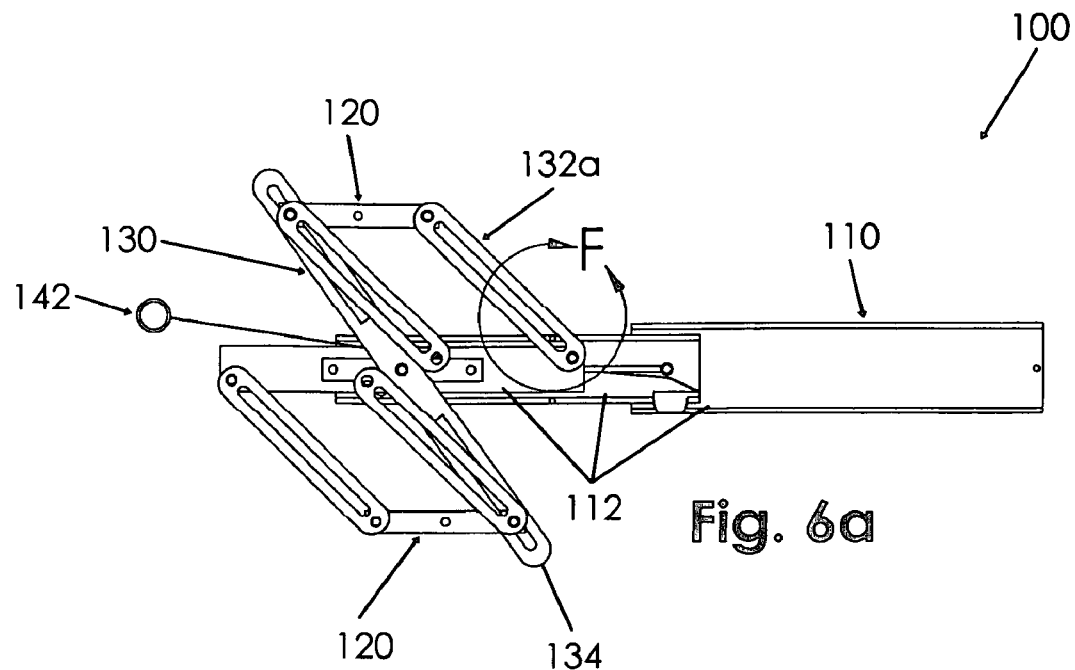
FIG. 6a is a side view of the step device as in FIG. 1 with one boom assembly removed and positioned in a partially extended and deployed configuration.
Figure 6B:
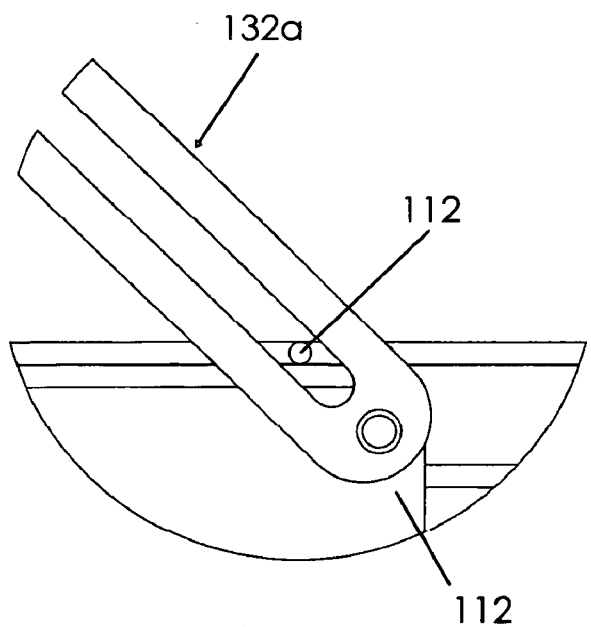

Means may be included for automatically moving the steps 120 between the collapsed and deployed configurations 122a, 122b when the boom assembly 110 is moved between the retracted and extended configurations 110a, 110b. For example, gears or linkage may be coupled to the boom assembly 110 and the steps 120. More particularly, as shown in FIG. 6a, one of the support links 132 may be a driving link 132a that is pivotally coupled with one of the telescoping members 112 and slidably coupled with another of the telescoping members 112 to cause the driving link 132a to rotate when the boom assembly 110 is moved between the retracted and extended configurations 110a, 110b. By rotating, the driving member 132a moves the associated step 120 between the collapsed and deployed configurations 122a, 122b. A common link 134 may additionally couple the step 120b with the step 120c so that the steps 120a, 120b are moved in concert between the collapsed and deployed configurations 122a, 122b. This coupling may either be direct or indirect. In other words, the common link 134 may be slidably coupled to the steps 120b, 120c or slidably coupled to appropriate support links 132, for example. As shown in FIG. 7a, the linkage 130 may be configured to rotate the step 120b toward the first end 114a of the boom assembly 110 when the steps 120 move toward the deployed configuration 122b and away from the first end 114a of the boom assembly 110 when the steps 120 move toward the collapsed configuration 122a. Such a configuration may allow the steps 120 to move to and from the extended configuration 122a closer to the truck bed 10 than would otherwise be possible.

One or more latch 140 may selectively maintain each boom assembly 110 at the extended configuration 110b, as shown in FIG. 7a, and one or more release mechanism 142 (e.g., pull cords, etc.) may be used to disengage the latch(es) 140, as shown in FIG. 7b. When the latches 140 are disengaged, the boom assemblies 110 may move from the extended configuration 110b to the retracted configuration 110a. As shown in FIG. 7d, a tension element 144 (e.g., a spring, tension cord, etc.) may bias the boom assemblies 110 toward the retracted configuration 110a.

In use, the boom assemblies 110 may be initially at the retracted configuration 110a and the steps 120 may be at the collapsed configuration 122a under the truck bed 10. To move the steps 120 to the deployed configuration 122b, the boom assemblies 110 may be pulled to the extended configuration 110b. As the boom assemblies 110 move to the extended configuration 110b, the driving link 132a and the common link 134 may automatically move the steps 120 to the deployed configuration 122b as described above. The latches 140 may maintain each boom assembly 110 at the extended configuration 110 and therefore the steps 120 at the deployed configuration 122b. To return the boom assemblies 110 and the steps 120 to the retracted and collapsed configurations 110a, 122a, the release mechanisms 142 may be used to disengage the latches 140. Once the latches 140 are disengaged, the tension element 144 may automatically move the boom assemblies 110 to the retracted configuration 110a. As the boom assemblies 110 move to the retracted configuration 110a, the driving link 132a and the common link 134 may automatically move the steps 120 to the collapsed configuration 122a.

It is understood that while certain forms of this invention have been illustrated and described, it is not limited thereto except insofar as such limitations are included in the following claims and allowable functional equivalents thereof.

The invention claimed is:

1. A step device for use in accessing a truck bed, said step device comprising:
    a telescopic boom assembly attachable to the truck bed for movement between retracted and extended configurations;
    a plurality of steps movable between collapsed and deployed configurations;
    linkage coupling at least one said step with said boom assembly;
    wherein;
        at least one said step is above said boom assembly when said steps are at said deployed configuration;
        at least one said step is below said boom assembly when said steps are at said deployed configuration;
        said linkage includes a common link connecting said step above said boom assembly with said step below said boom assembly;
        said boom assembly includes first and second ends, said steps being adjacent said second end when said steps are at said deployed configuration; and said linkage is configured to rotate said step above said boom assembly toward said first end of said boom assembly when said steps move toward said deployed configuration and away from said first end of said boom assembly when said steps move toward said collapsed configuration.

2. The step device of claim 1, further comprising means for automatically moving said steps between said collapsed and deployed configurations when said boom assembly is moved between said retracted and extended configurations, respectively.

3. The step device of claim 1, wherein:
said boom assembly includes a plurality of telescoping members; and
said linkage includes at least one driving link pivotally coupled with one said telescoping member and slidably coupled with another said telescoping member to cause said driving link to rotate when said boom assembly is moved between said retracted and extended configurations.

4. The step device of claim 3, further comprising:
a latch for selectively maintaining said boom assembly at said extended configuration; and
a release mechanism for disengaging said latch and allowing said boom assembly to move from said extended configuration to said retracted configuration.

5. The step device of claim 4, further comprising a tension element for biasing said boom assembly toward said retracted configuration.

6. The step device of claim 1, wherein:
said boom assembly includes a plurality of telescoping members; and
said linkage includes at least one driving link pivotally coupled with one said telescoping member and slidably coupled with another said telescoping member to cause said driving link to rotate when said boom assembly is moved between said retracted and extended configurations, whereby moving said steps between said collapsed and deployed configurations.

7. A step device for use in accessing a truck bed, said step device comprising:
a telescopic boom assembly attachable to the truck bed and movable between retracted and extended configurations, said boom assembly including a plurality of telescoping members;
a plurality of steps movable between collapsed and deployed configurations, said plurality of steps comprising a first step above said boom assembly when said steps are at said deployed configuration and a second step below said boom assembly when said steps are at said deployed configuration;
linkage coupling said first step with said boom assembly, said second step with said boom assembly, and said first step with said second step;
wherein said plurality of steps includes a third step coupled to said boom assembly; and
wherein said third step is vertically immobile when said steps move between said collapsed and deployed configurations.

8. The step device of claim 7, wherein:
said linkage includes first and second support links coupling said first step with said boom assembly;
said linkage includes third and fourth support links coupling said second step with said boom assembly;
one said support link is a driving link pivotally coupled with one said telescoping member and slidably coupled with another said telescoping member to cause said driving link to rotate when said boom assembly is moved between said retracted and extended configurations, whereby moving said step associated with said driving link between said collapsed and deployed configurations; and
said linkage includes a common link coupling said first step with said second step to move said first and second steps between said collapsed and deployed configurations in concert.

9. The step device of claim 8, wherein:
said first and second support links are rotatably coupled to said first step;
said third and fourth support links are rotatably coupled to said second step; and
said common link is slidably coupled to said first step and slidably coupled to said second step.

10. The step device of claim 8, further comprising:
a latch for selectively maintaining said boom assembly at said extended configuration; and
a release mechanism for disengaging said latch and allowing said boom assembly to move from said extended configuration to said retracted configuration.

11. The step device of claim 10, further comprising a tension element for biasing said boom assembly toward said retracted configuration.

12. The step device of claim 7, wherein said first and second steps are generally equidistant from said boom assembly when said steps are at said deployed configuration.

13. The step device of claim 12, wherein said first and second steps are generally equidistant from said boom assembly when said steps are at said collapsed configuration.

14. The step device of claim 7, wherein said first and second steps are generally equidistant from said third step at all times.

* * * * *